Oct. 21, 1969  D. B. ABBOTT ET AL  3,473,781
ADJUSTABLE EXHAUST RESTRICTOR
Filed March 10, 1966
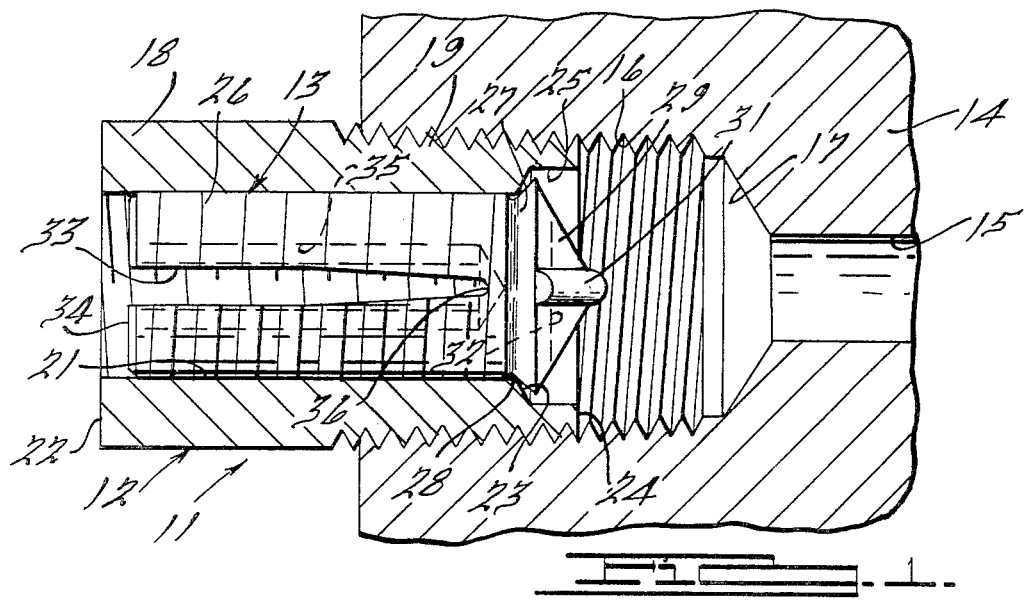
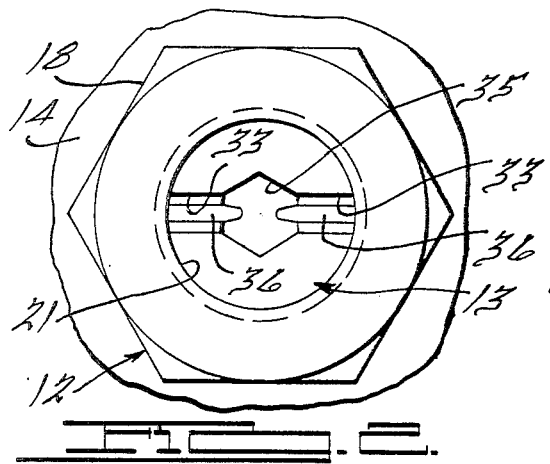
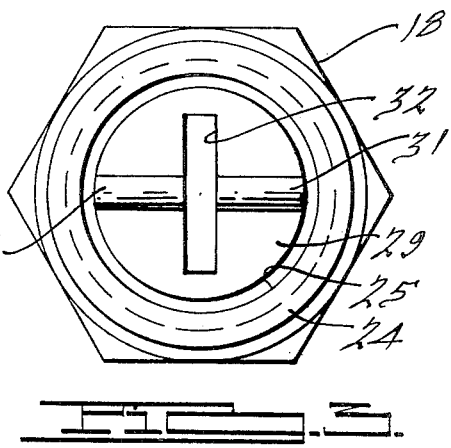
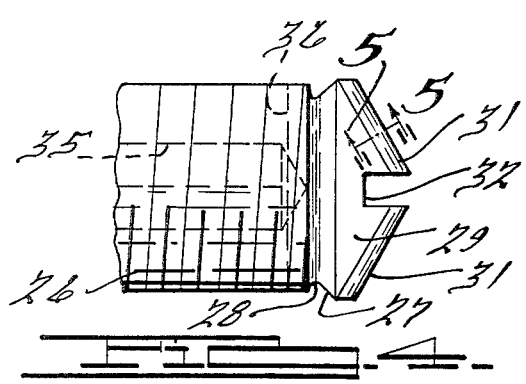
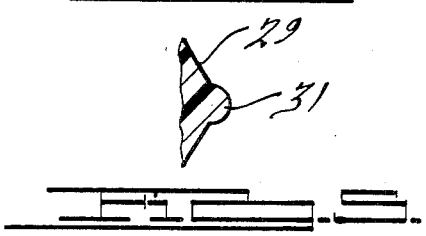
INVENTORS
Daniel B. Abbott
Andrew B. Huntington
BY Carnes, Dickey & Pierce
ATTORNEYS United States Patent Office 3,473,781
Patented Oct. 21, 1969

3,473,781
ADJUSTABLE EXHAUST RESTRICTOR
Daniel B. Abbott, Clawson, and Andrew B. Huntington, Royal Oak, Mich., assignors to Ross Operating Valve Company, Detroit, Mich., a corporation of Michigan
Filed Mar. 10, 1966, Ser. No. 533,307
Int. Cl. F16k 31/44; F16l 55/02
U.S. Cl. 251—121                                 10 Claims

ABSTRACT OF THE DISCLOSURE

A body is threaded into an exhaust port and a stem is threaded into the body. The stem has a head at its inner end coacting with a seat in the body, and an elongated slot in the stem is exposed in varying degrees, depending on rotation of the stem. The stem shoulder prevents its accidental removal, and the slot permits access by a screw driver for adjusting purposes.

---

This invention relates to adjustable exhaust restrictors, and more particularly to devices for adjustably restricting the exhaust flow from a fluid-actuated device.

It is an object of the invention to provide a novel and improved adjustable exhaust restrictor which is of extremely simple, compact and inexpensive construction, being fabricated of only two parts.

It is another object to provide an improved exhaust restrictor of this type in which the adjusting element is captive and cannot be accidentally removed or lost.

It is a further object to provide an improved device of this character in which the adjustment may made by a single tool such as a screw driver.

It is also an object to provide an adjustable exhaust restrictor of this charcter which has a very sensitive adjustment.

The manner of accomplishing the foregoing objects and other objects and features of this invention will become apparent from the following description of embodiments of the invention when read with reference to the accompanying drawings, in which:

FIGURE 1 is a cross-sectional view in elevation of the novel exhaust restrictor of this invention, shown as mounted in the exhaust port of a fluid-actuated device;

FIGURE 2 is an end elevational view of the restrictor;

FIGURE 3 is an elevational view of the restrictor from the opposite end,

FIGURE 4 is a bottom plan view of a portion of the stem, and

FIGURE 5 is a fragmentary cross-sectional view taken along the line 5—5 of FIGURE 4.

Briefly, the illustrated embodiment of the invention comprises a generally cylindrical body which is exteriorly threaded at one end so as to be mounted in an exhaust port, and has a threaded bore. A wider unthreaded bore is provided at the inner end of the body, with a flared shoulder connecting it with the threaded bore.

A stem is threadably mounted within the threaded bore of the body, this stem having an outwardly flared head within the enlarged body bore. The sloping surface on this head will coact with the flared shoulder on the body to completely close the exhaust passage when desired. A diametrical slot extends axially through most of the main portion of the stem, this slot being open at the outer stem end. The stem is also provided with a central recess extending from the outer end for approximately the same length as the slot and connected therewith.

In use, the stem will be located to properly adjust the length of the slot which is exposed to the enlarged bore at the inner end of the body. The length of this exposed slot portion will determine the exhaust flow rate through the restrictor. With the slot entirely within the threaded body portion, but the flared part of the stem not yet engaging the body seat, a greatly restricted flow will occur along the mating threads of the body and stem. To completely close the restrictor, the stem is screwed outwardly until its flared portion engages the flared body seat.

Referring more particularly to the drawings, the restrictor is generally indicated at 11 and comprises a body generally indicated at 12 and a stem generally indicated at 13. Restrictor 11 is adapted to be mounted in a housing of a fluid-actuated device partially shown at 14. This housing has an exhaust passage 15 leading to an internally threaded exhaust port 16. Normally, port 16 will be of larger diameter than passage 15, and the drill for forming port 16 will create a frustoconical surface 17 connecting passage 15 and port 16.

Body 12 has an outer tool-engageable portion 18 of hexagonal shape and an inner mounting portion 19 which is externally threaded so as to be mounted in port 16. A threaded bore 21 extends centrally into the major portion of body 12, from the outer face 22 thereof to a flared shoulder 23 adjacent the inner end 24. An enlarged bore 25 extends from end 24 to flared shoulder 23.

Stem 13 comprises a main externally threaded portion 26, and a flared shoulder 27 adjacent the inner end thereof, shoulder 27 being connected to portion 26 by a recessed or undercut portion 28. The outer edge of shoulder 27 is substantially smaller in diameter than bore 25. A conical portion 29 extends inwardly from the outer edge of shoulder 27, and is surmounted by a diametrically extending ridge 31. Ridge 31 has a semicircular cross-sectional shape, as seen in FIGURE 5. The ridge, as well as portion 29, has a diametral slot 32 extending at right angles to ridge 31, as seen in FIGURES 3 and 4, the depth of slot 32 being less than that of portion 29. The angle of flare of shoulder 27 is somewhat less than that of seat 23 so that shoulder 27 may engage the seat with line contact to create a sealing action.

A diametral slot 33 extends through threaded portion 26 of the stem and axially along the major portion thereof, as seen in FIGURE 1.

This slot is open at the outer end 34 of the stem, but its length is such that when shoulder 27 engages seat 23, the slot will be entirely within threaded bore 21 of body 12. The inner end of slot 33 is preferably tapered, so that the width of the slot at its inner end is somewhat less than at its outer end.

A central recess 35 extends from end 34 of stem 13 through portion 26 thereof. This recess is shown as having a hexagonal cross-sectional shape so that it may receive a hexagonal key wrench. Slot 33 is contiguous with recess 35, and the cross-sectional area of the recess is such that it will be able to carry whatever fluid flows into slot 33 from bore 25 when a major portion of the slot is exposed to the bore. The inner end 36 of slot 33 is spaced axially from shoulder 27 so that when this surface engages seat 23, no portion of slot 33 will be exposed to bore 25.

To assemble restrictor 11, stem 13 will be threaded into body 12 from the right hand end thereof as seen in FIGURE 1, before the restrictor is mounted in housing 14. This assembly of the stem into the body is simplified by the presence of slot 32, which will enable the operator to use a screw driver for assembly purposes. Restrictor 11 may be mounted in port 16 by threading body 12 into the port until it is tightly secured, the threads being such that no leakage can occur through them.

To adjust the restrictor, it is merely necessary to insert a screw driver into the exposed end of slot 33 or a hexagonal screw wrench into the exposed end of recess 35. Turning the tool will adjust the axial position of stem 13 with respect to body 12.

If it is desired to have unrestricted exhaust flow, the stem will be screwed inwardly (to the right in FIGURE 1) to its maximum extent, that is, until ridge 31 engages surface 17. The purpose of the ridge is to prevent portion 29 of the stem from blocking flow from passage 15 into port 16. Since the diameter of port 16 is substantially greater than the outer diameter of shoulder 27 at its juncture with portion 29, the fluid will flow around portion 29 and past shoulder 27. The fluid will then flow radially inwardly through both sides of slot 33 and into passage 35 from where it will flow axially outwardly (to the left in FIGURE 1) to the atmosphere.

Should it be desired to restrict the rate of exhaust flow, the tool will be inserted in stem 13 and the stem will be rotated so as to withdraw more of the slots 33 from its exposed position to a position within bore 21. The rate of fluid flow can be adjusted by the extent to which slot 33 is withdrawn into bore 21. Because stem 13 can be adjusted to an infinite number of positions by rotating the stem, the restriction adjustment will be quite sensitive. In fact, as the inner end 36 of the slot approaches the right hand end of bore 21, the adjustment will be even more sensitive since the width of slot 33 is narrower at the right hand end.

When slot 33 is entirely within bore 21, but shoulder 27 still does not engage seat 23, there will still be a small amount of fluid flow along the interengaged threads of bore 21 and stem portion 26. Thus, an even more sensitive adjustment can be made at these small flow rates. The length of the helical path along which the fluid flows will determine the restriction in this case, so that very fine control can be obtained by slight rotation of the stem when slot 33 is completely surrounded by bore 21. When in this position, the hexagonal key wrench could be left in recess 35, since the fluid flow will be along the threads rather than through this recess.

To entirely close the restrictor, stem 13 will be rotated until shoulder 27 engages seat 23. This line contact will create a good sealing action.

It will be noted that stem 13 cannot be inadvertently withdrawn from body 12 since the engagement of shoulder 27 with seat 23 will prevent further withdrawal of the stem.

While it will be apparent that the embodiment of the invention herein disclosed is well calculated to fulfill the objects of the invention, it will be appreciated that the invention is susceptible to modification, variation and change without departing from the proper scope or fair meaning of the subjoined claims.

What is claimed is:

1. In an adjustable flow restrictor, an elongated body, means on said body for securing said body to a housing having a port, said body being secured to said housing in proximity to said port, a passage extending through said body, said passage comprising at least a first portion terminating in a seat, said first portion being threaded along a substantial portion of its length with the threads terminating at said seat, and a restrictor element having a threaded stem received in said threaded part of said first portion, an enlarged portion adjacent said stem and defining a shoulder juxtaposed to said seat and a slot extending from the end of said stem remote from said shoulder along said stem and terminating at a point spaced from and adjacent to said shoulder, said restrictor element being axially adjustable relative to said body from a fully closed position wherein said shoulder engages said seat and flow between said passage and said port is precluded to a first restricted position wherein said shoulder is spaced from said seat and the inner termination of said slot is spaced from said seat for restricted flow between the port and the slot through the clearance between the threads and a less restricted position wherein said shoulder is spaced from said seat and said slot is in registry with said port for flow directly between said port to said slot.

2. An adjustable flow restrictor as set forth in claim 1 wherein the passage includes a second portion of larger diameter than the first portion and terminating at the seat, the enlarged portion of the restrictor element being larger in size than the first portion of the passage for precluding removal of said restrictor element from said passage through said first portion.

3. In an exhaust restrictor, an elongated body having an externally threaded inner portion mounted in a threaded exhaust port, a threaded bore extending inwardly from the outer end of said body through a major portion thereof, an enlarged bore at the inner end of said body within said exhaust port, a flared seat connecting said enlarged bore with said threaded bore, the diameter of said enlarged bore being less than the diameter of said exhaust port, a stem having an externally threaded portion along its major extent, an enlarged head at the inner end of said stem, whereby outward removal of said stem from said body is prevented, a flared shoulder connecting said head and threaded portion, said head being disposed within and having a diameter substantially smaller than said enlarged body bore, said shoulder being engageable with said seat when said stem is moved outwardly, said head being formed with a conical shaped portion extending from the outer edge of said shoulder away from the adjacent end of said stem, a ridge extending across said conical shaped portion and adapted to engage the portion of the body defining the exhaust port for permitting flow through the exhaust port while precluding removal of the stem from said threaded bore, and a slot in said threaded stem portion extending axially from the outer end thereof, said slot being adapted to receive a screw-driver from the outside for adjusting said stem, the length of said slot being such that it will be entirely disposed within said threaded body bore when said shoulder engages said seat, the shoulder and seat being engageable to prevent fluid flow therethrough.

4. The combination according to claim 3, said slot extending diametrically through said stem, the inner end of said slot being spaced axially from said shoulder.

5. The combination according to claim 3, the axially inner portion of said slot being tapered toward its inner end.

6. The combination according to claim 3, further provided with a recess of non-circular cross-sectional shape extending axially inwardly from the outer end of said stem and connected to said slot.

7. The combination according to claim 3, said seat being flared toward the inner end of said body, said shoulder being flared toward the inner end of said stem, the flare angle of said seat being greater than that of said shoulder whereby there will be line contact between the seat and shoulder when they are engaged.

8. The combination according to claim 7, further provided with a recessed portion between said shoulder and said threaded stem portion.

9. The combination according to claim 3 further provided with a diametral slot extending across said conically shaped portion, whereby assembly of the stem in the body will be facilitated.

10. The combination according to claim 3, the outer end of said body having a non-circular cross-sectional shape, whereby it may be engaged by a tool for mounting purposes.

References Cited

UNITED STATES PATENTS

| | | | |
|---|---|---|---|
| 425,276 | 4/1890 | Warden | 251—284 X |
| 591,745 | 10/1897 | Du Brul | 251—216 X |
| 1,078,584 | 11/1913 | Jones | 138—46 |
| 1,359,441 | 11/1920 | Smith | 138—46 |
| 2,014,314 | 9/1935 | Defenbaugh | 138—46 X |
| 2,460,407 | 2/1949 | Andrus | 138—43 X |
| 3,192,949 | 7/1965 | De See | 251—333 X |
| 2,841,175 | 7/1958 | Ford | 251—216 X |

LAVERNE D. GEIGER, Primary Examiner

EDWARD J. EARLS, Assistant Examiner

U.S. Cl. X.R.

138—43; 251—216